United States Patent
Tomioka

(10) Patent No.: US 8,009,186 B2
(45) Date of Patent: Aug. 30, 2011

(54) IMAGE FORMING APPARATUS

(75) Inventor: Yuichi Tomioka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 12/491,232

(22) Filed: Jun. 25, 2009

(65) Prior Publication Data

US 2009/0324293 A1 Dec. 31, 2009

(30) Foreign Application Priority Data

Jun. 27, 2008 (JP) .................. 2008-168764

(51) Int. Cl.
*B41J 2/435* (2006.01)
*B41J 2/47* (2006.01)

(52) U.S. Cl. ....................... 347/235; 347/250

(58) Field of Classification Search .......... 347/116, 347/229, 234, 235, 248–250
See application file for complete search history.

(56) References Cited

U.S. PATENT DOCUMENTS

| 6,317,244 B1 * | 11/2001 | Ishibe | 359/204.1 |
| 6,940,535 B2 * | 9/2005 | Ishihara | 347/235 |
| 2008/0285104 A1 * | 11/2008 | Arai et al. | 359/205 |

FOREIGN PATENT DOCUMENTS

JP 2004-345172 A 12/2004

* cited by examiner

*Primary Examiner* — Hai C Pham
(74) *Attorney, Agent, or Firm* — Canon U.S.A., Inc., IP Division

(57) ABSTRACT

An image forming apparatus includes photosensitive drums including one for black, light source devices, a rotary polygonal mirror having deflecting surfaces with chamfers, input optical systems, imaging optical systems and a synchronism detecting system for detecting a synchronizing light beam for determining the timing for scanning each of the photosensitive drums in a main scan direction, wherein the synchronism detecting system detects a light beam for forming an image of a color different from the black, and wherein the timing as the synchronism detecting device obtains a synchronizing signal and the timing as a light beam from the input optical system, which is at the side where the synchronism detecting device is provided, is incident on the chamfer of the deflecting surface of the rotary polygonal mirror, are at least partly overlapping.

3 Claims, 13 Drawing Sheets

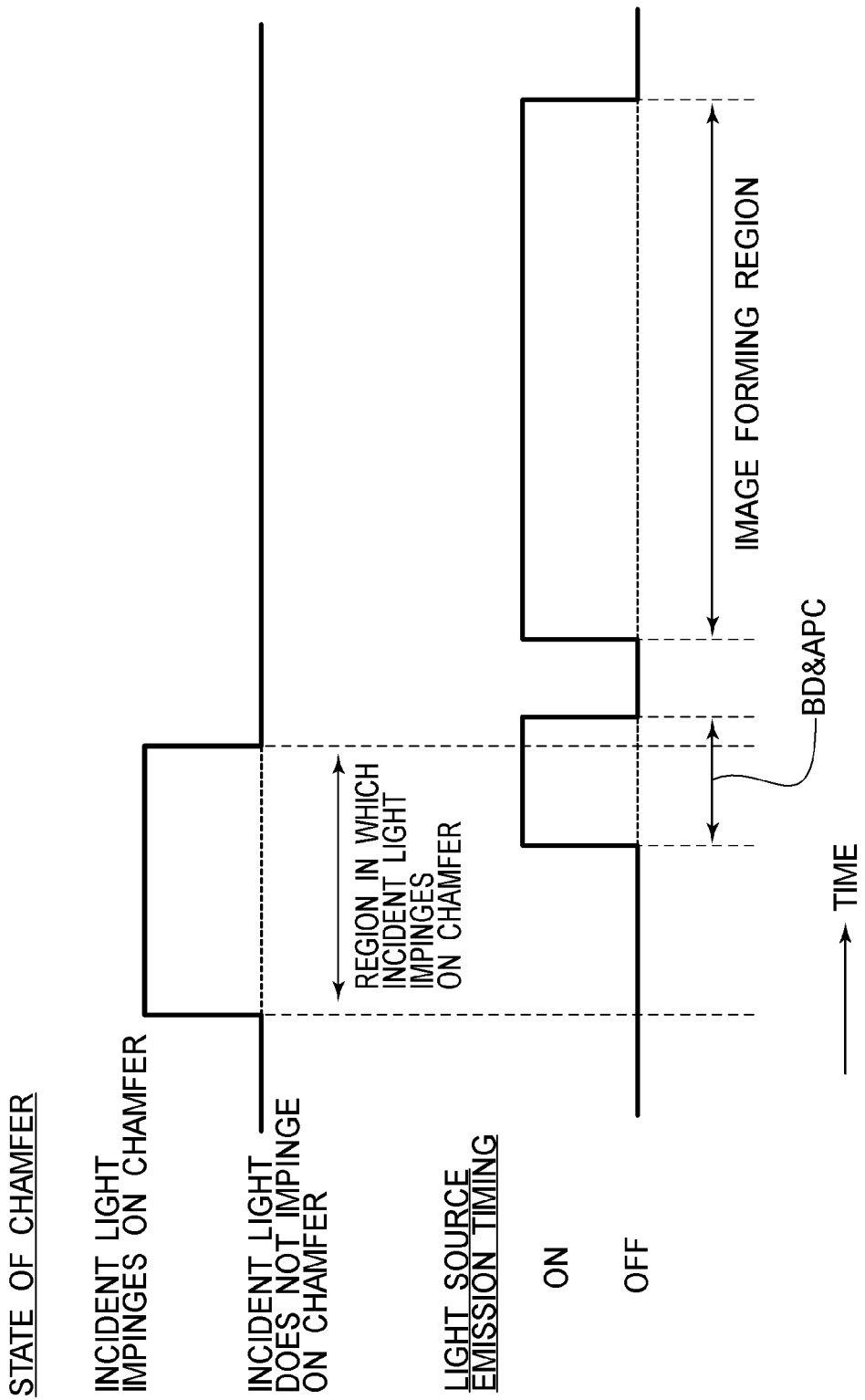

--Prior Art--

--Prior Art--

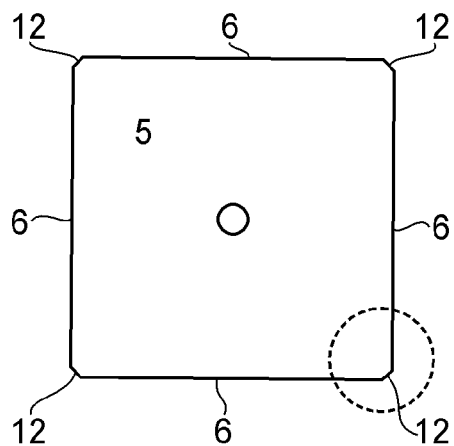
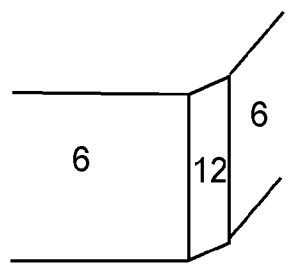
FIG.4A  FIG.4B
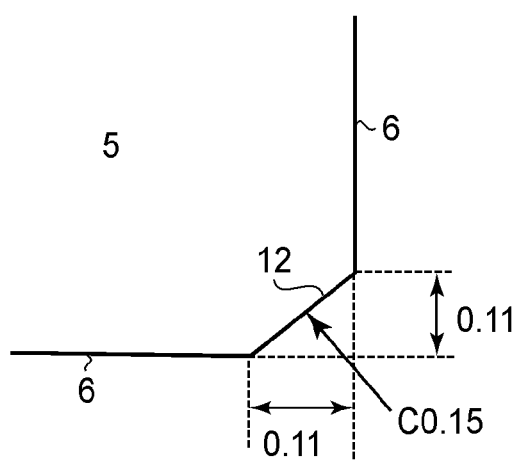
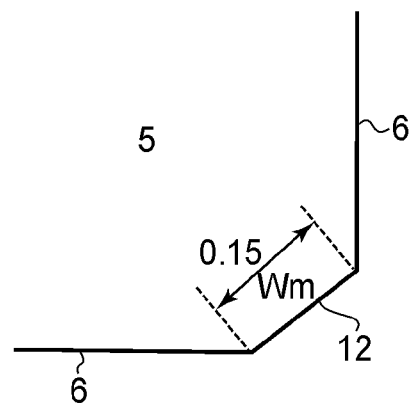
FIG.4C  FIG.4D

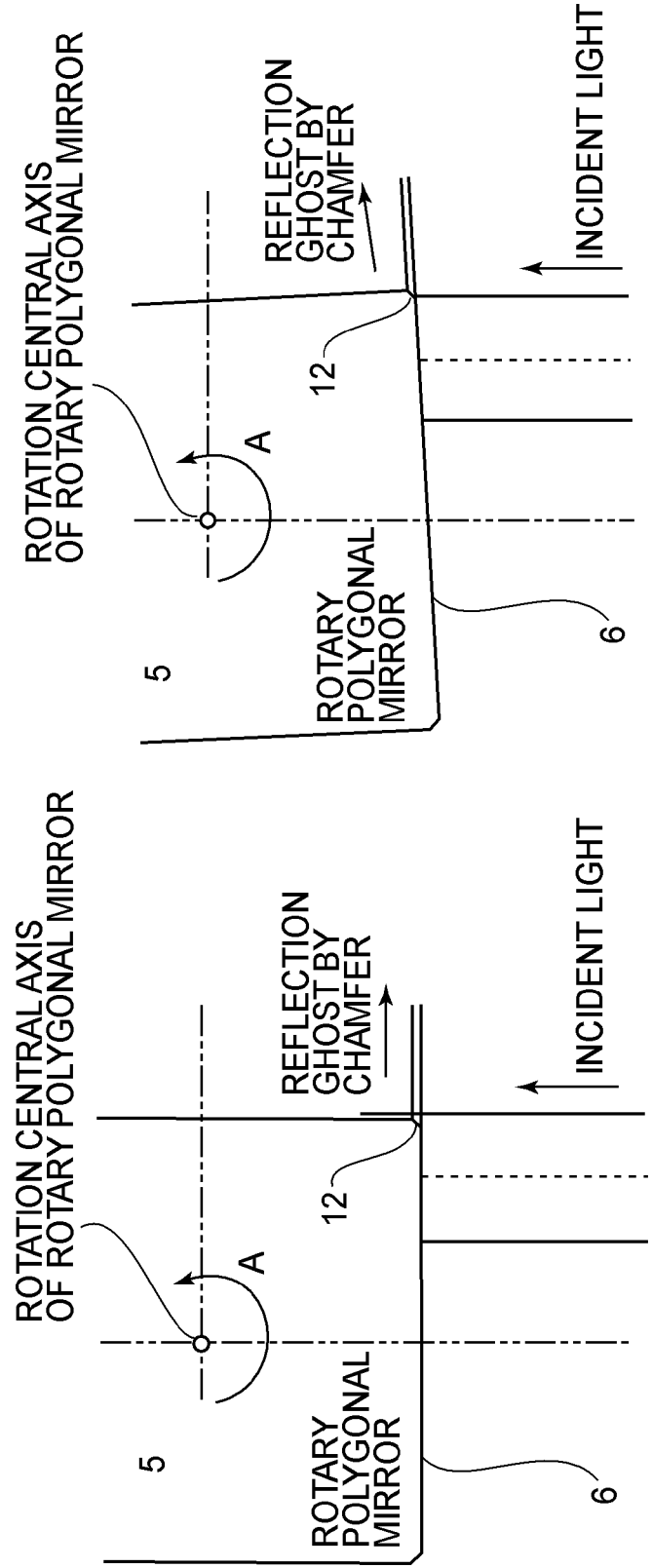

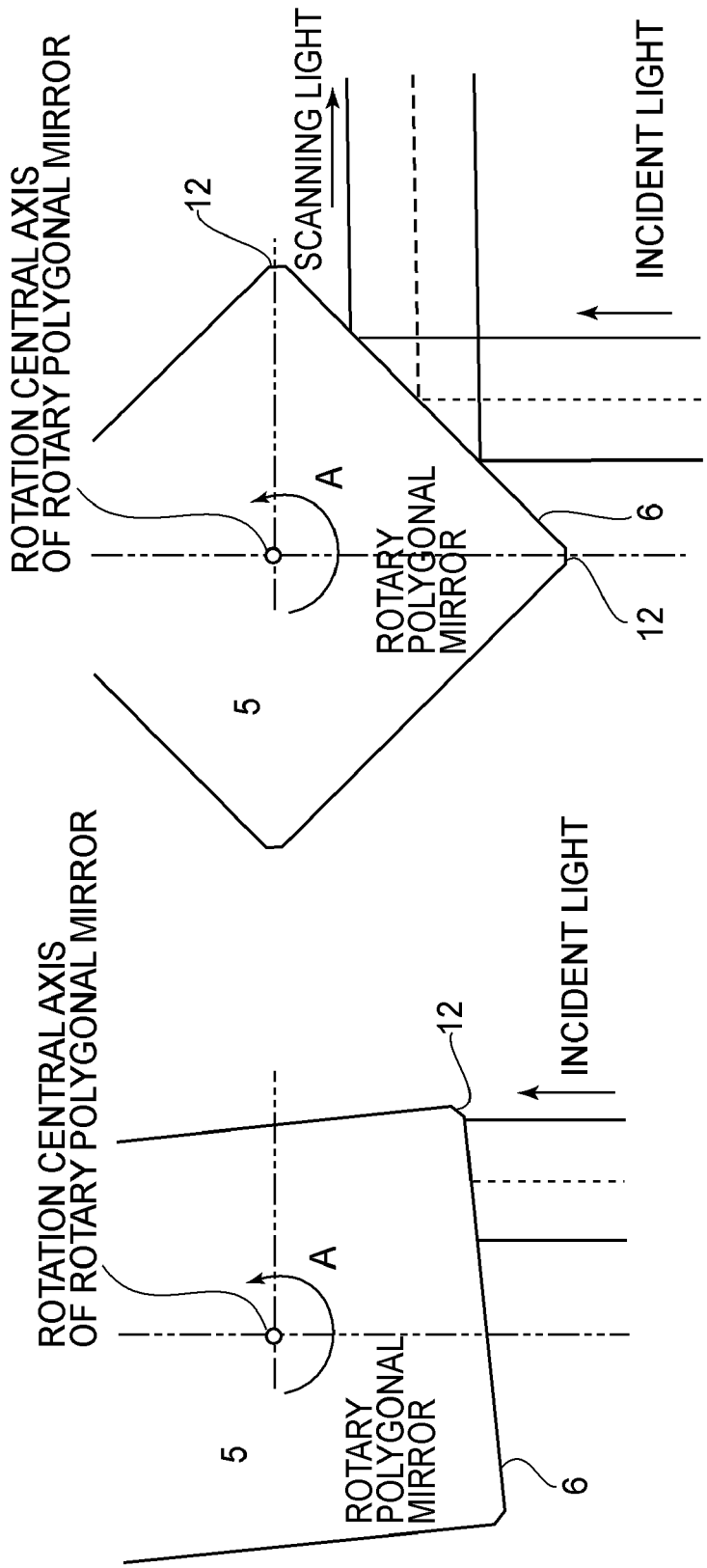

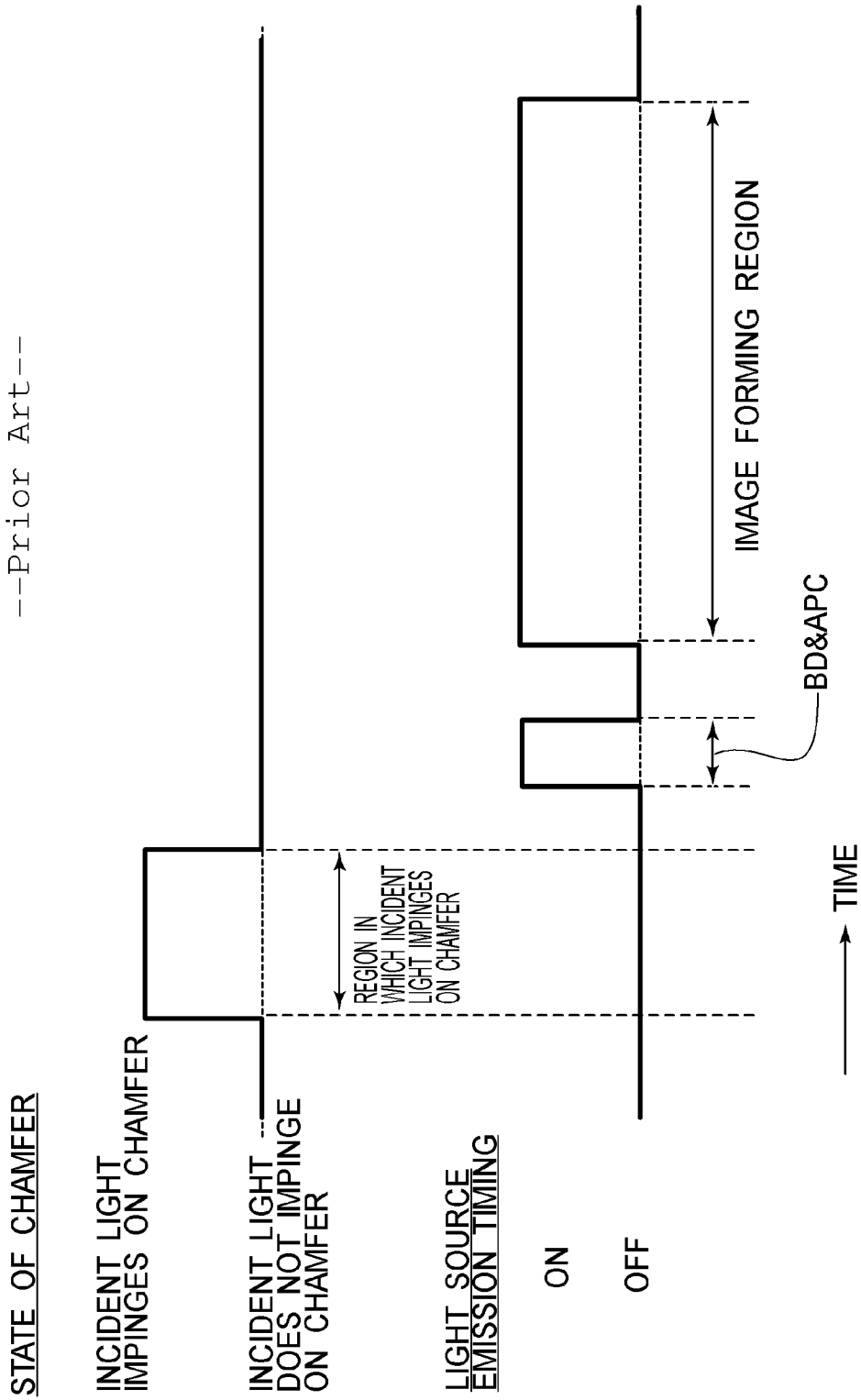
FIG.6A --Prior Art--

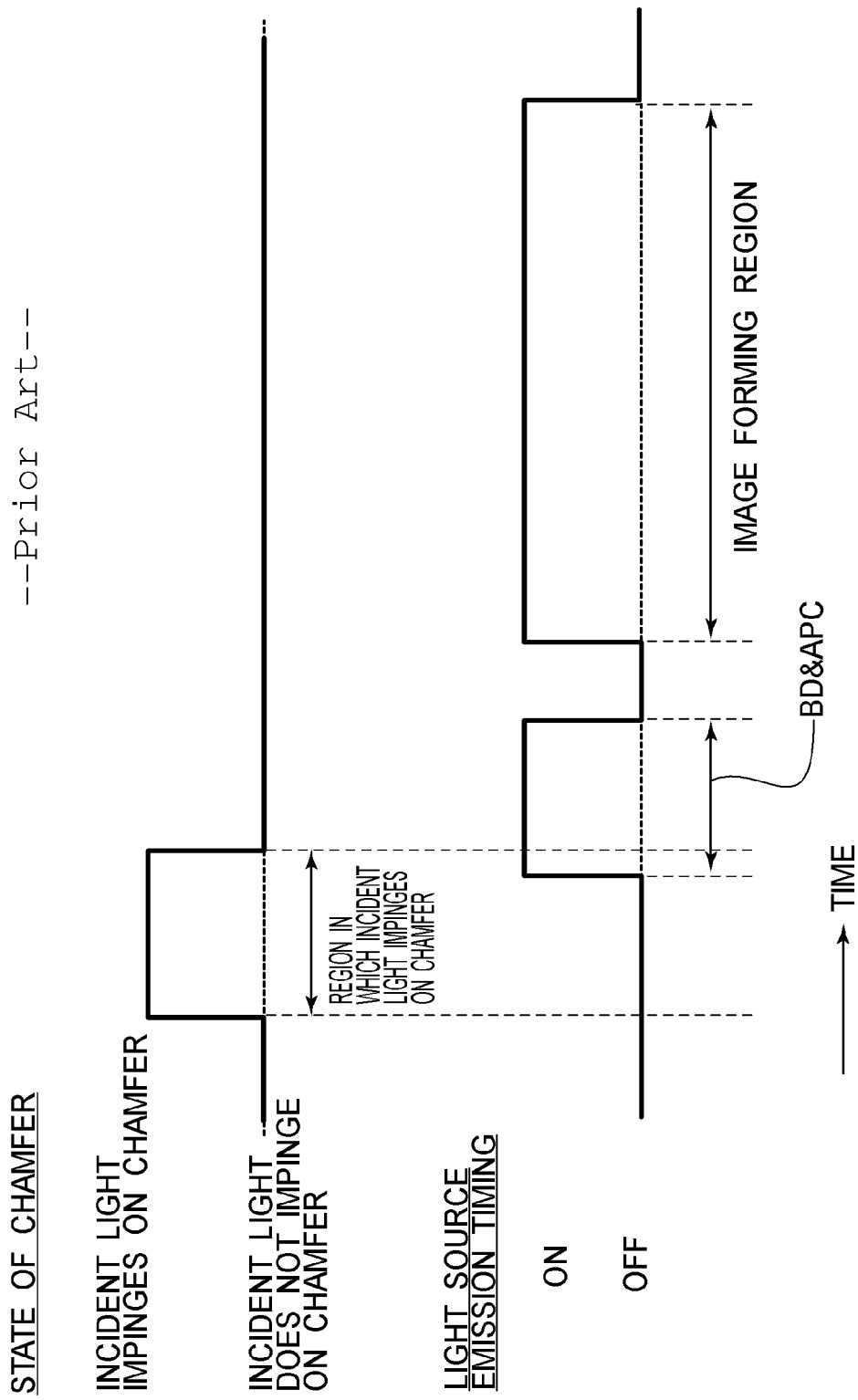
FIG.6B --Prior Art--

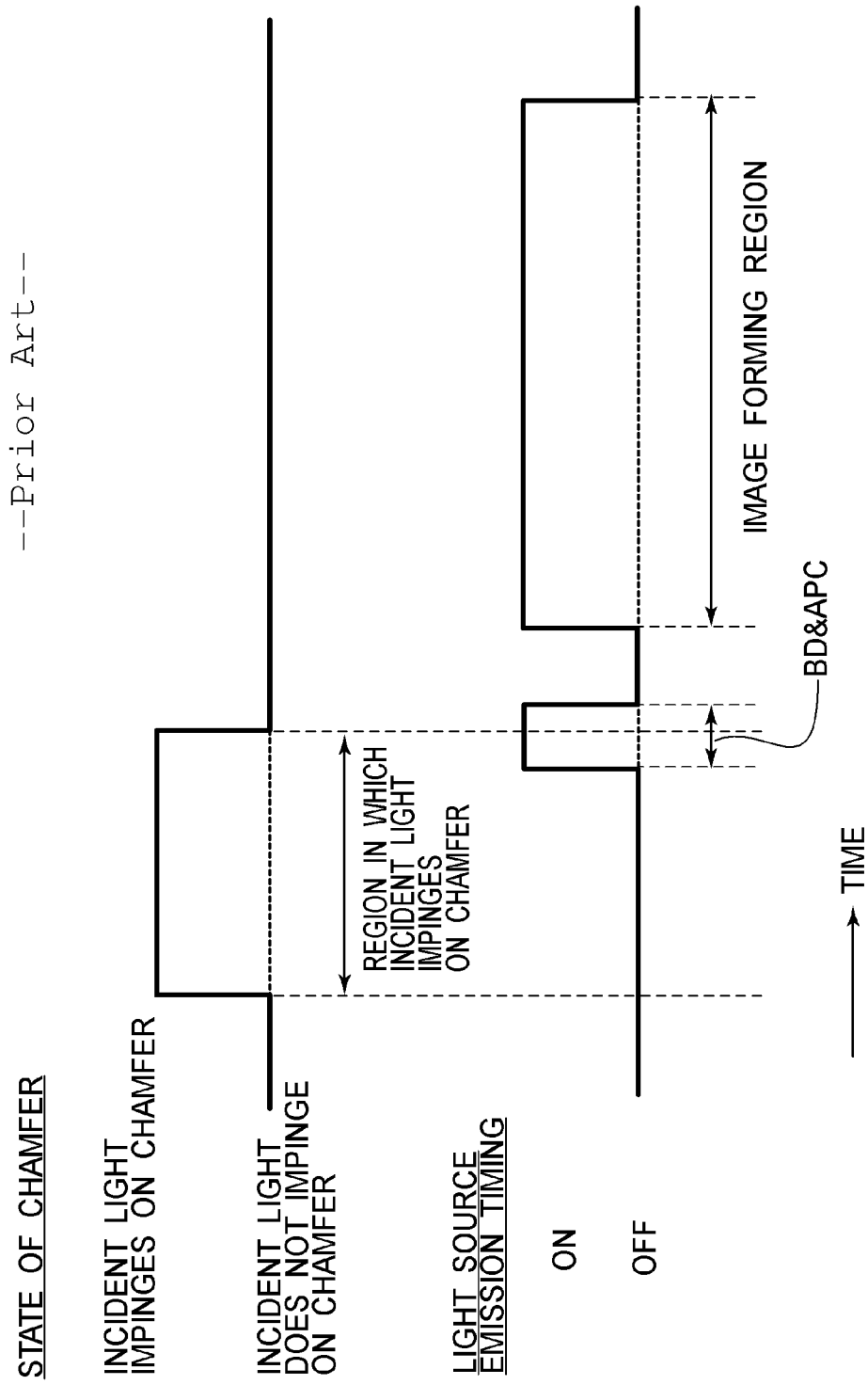
FIG.6C --Prior Art--

IMAGE FORMING APPARATUS

FIELD OF THE INVENTION AND RELATED ART

This invention relates to an image forming apparatus. More particularly, the present invention is suitably usable in an image forming apparatus such as a laser beam printer (LBP), a digital copying machine or a multifunction printer, for example, having an electrophotographic process.

In recent years, in image forming apparatuses such as laser beam printers, digital copying machines or multifunction printers, compactification of the apparatus has been desired.

Various proposals have been made in regard to this type of image forming apparatus (see patent document No. 1).

FIG. 3A and FIG. 3B are sectional views of an image forming apparatus which is disclosed in FIG. 2 of the patent document No. 1. FIG. 3A is a sectional view in the main-scan direction (main-scan sectional view) of a main portion of the image forming apparatus, and FIG. 3B is a sectional view in the sub-scan direction (sub-scan sectional view) of a main portion of the image forming apparatus.

As illustrate in FIG. 3A, in the patent document No. 1, light beams based on respective color lights from an input optical system are incident on a single rotary polygonal mirror at an upper and lower portions thereof, respectively, with respect to the sub-scan direction. Then, the two scanningly deflected light beams are directed through corresponding imaging optical systems to corresponding photosensitive drums 11a and 11b (11c and 11d), respectively. By this, the overall system is compactified.

Furthermore, another set of input optical system and imaging optical system such as mentioned above are disposed opposed to the former set across the rotary polygonal mirror, such that, four light beams are scanningly deflected by a single rotary polygonal mirror toward four photosensitive drums corresponding to four colors (Y, M, C and K in FIG. 3B), respectively. By this, the overall system is compactified.

Furthermore, this type of image forming apparatus comprises, as synchronism detecting means, a synchronism detecting lens (beam detecting (BD) lens) and a synchronism detecting sensor (beam detecting (BD) sensor) which are disposed at the imaging optical system side for black (Bk). With this structure, the synchronism is taken for the four light beams only by one synchronism detecting means, by which the overall system structure is simplified.

On the other hand, in the rotary polygonal mirror, the ridgeline between adjoining deflecting surfaces is chamfered so as to improve the finishing precision of the deflecting surfaces (deflective reflection surfaces).

Here, the chamfering is a process for cutting the joint (ridge) between adjoining surfaces, and this is done by the removal using a shaving or chamfering tool or a file. Alternatively, the chamfering is done by a squeezing process using a press.

FIG. 4A through FIG. 4D are schematic diagrams for explaining the chamfering of deflecting surfaces 6. As shown in FIG. 4A and FIG. 4B, after the chamfering process of the deflecting surfaces 6, chamfers 12 are formed. FIG. 4C and FIG. 4D are schematic diagrams illustrating a chamfer 12. Of FIG. 4C and FIG. 4D, FIG. 4C illustrates the "C chamfering". Here, the "C chamfering" is a process for cutting two crossing surfaces, at an angle of 45 degrees. With regard to the method of designation, if the deflection surfaces 6 should be cut at respective positions of 0.11 mm and by 45 degrees, for example, it is designated as "C0.11". Alternatively, as shown in FIG. 4D, the designation may be specified based on the width of the chamfer 12. Furthermore, the shape of the chamfer 12 is not limited to planner but it may be an arcuate shape, for example.

With regard to this chamfer 12, depending on the relationship with the rotary polygonal mirror or the light beam width, it is possible that, when the rotary polygonal mirror is at a certain rotational angle, the input light beam impinges on the chamfer 12.

FIG. 5A through FIG. 5D are schematic diagrams for explaining the states wherein the input light beam impinges on or does not impinge on the chamfer 12 of the deflecting surfaces 6, depending on the rotational angle of the rotary polygonal mirror 5.

FIG. 5A, FIG. 5B and FIG. 5C illustrate how the input light beam impinges on the chamfer. Furthermore, FIG. 5A, FIG. 5B and FIG. 5C sequentially depict the state, with respect to time, in the neighborhood of the deflecting surface in the non-image forming area. Furthermore, FIG. 5D illustrates the state in which, in the image forming area, the input light beam is deflectively scanned by means of the deflecting surface of the rotary polygonal mirror.

When the rotational angle of the rotary polygonal mirror 5 is such as shown in FIG. 5A and FIG. 5B, it is seen that the input light beam impinges on the chamfer 12. Here, if the light source means corresponding to the input light beam is emitting the light, the input light beam is reflected by the chamfer 12, whereby ghost light (hereinafter, it will be referred to also as "reflection ghost") which is unnecessary for the image formation is produced. The reflection ghost reflected by this chamfer 12 can reach the photosensitive drum surface. As a result of this, density unevenness (black stripes or white blank stripes) is produced in the formed image, and thus satisfactory image formation is disabled.

FIG. 6A and FIG. 6B are timing charts which depict the relationship between the light emission timing of the light source means and the timing as the input light beam impinges on the chamfer.

FIG. 6A depicts the relationship between the light emission timing of the light source means and the timing as the input light beam impinges on the chamfer in a case where no reflection ghost is produced at the chamfer. FIG. 6B depicts the relationship between the light emission timing of the light source means and the timing as the input light beam impinges on the chamfer in a case where reflection ghost is produced at the chamfer.

As can be seen from FIG. 6A and FIG. 6B, the light source means is still emitting light even out of the image forming area, this being for the beam detection (BD) or automatic power control (APC). In ordinary image forming apparatuses (optical scanning devices), as seen from FIG. 6A, the light source means is not energized to emit light at the timing as the light beam comes to the chamfer. Thus, there is no possibility that the input light impinges on the chamfer, such that no reflection ghost is produced from the chamfer.

[Patent Document]

No. 1: Japanese Laid-Open Patent Application No. 2004-345172

However, if the rotating speed of the rotary polygonal mirror is set faster to meet the speedup of the printing speed; the angle through which the rotary polygonal mirror rotates in a time period from the pre-light emission of the light source means of the synchronism detecting means to the detection of the synchronizing signal (BD signal) becomes wider. Alternatively, the angle through which the rotary polygonal mirror rotates in a time period in which the light source means is caused to emit light for the purpose of APC adjustment becomes wider. Here, the relationship of the light emission timing of the light source means and the timing as the input light can impinge on the chamfer in the case where a reflection ghost produces at the chamfer, is in a partly overlapping one as shown in FIG. 6B, such that it is used in the state that a reflection ghost is produced at the chamfer.

Alternatively, when the spot diameter on the photosensitive drum should be set smaller or the fθ coefficient of the imaging optical system should be set larger for higher image accuracy, it is necessary to make wider the light beam width on the deflecting surface of the rotary polygonal mirror. Then, the region in which the input light beam can impinge on the chamfer becomes larger, and the relationship between the light emission timing of the light source means and the timing as the input light beam impinges on the chamfer is such as shown in FIG. 6C. As a result, it is possible that the synchronism detection or the APC is carried out in the state in which a reflection ghost is produced at the chamfer. Here, if the BD signal is taken through the imaging optical system for the black color, as shown in FIG. 6C, the reflection ghost occurring due to the chamfer can reach the photosensitive drum for the black color.

The black color is a color which is most conspicuous in the image in comparison with yellow (Y), cyan (C) or magenta (M). Thus, if a reflection ghost is produced on the photosensitive drum for black, it causes black-colored conspicuous stripes on the formed image, which disables formation of good images.

The present invention provides an image forming apparatus by which the influence of the ghost light upon an image which is produced at the chamfer of the rotary polygonal mirror is reduced and a satisfactory image can be produced.

In accordance with an aspect of the present invention, there is provided an image forming apparatus comprising: a plurality of light source devices; a rotary polygonal mirror configured to scanningly deflect, with different deflecting surfaces, a plurality of light beams emitted from said plurality of light source devices; a plurality of imaging optical systems provided in relation to the plurality of light beams, respectively, scanningly deflected by said different deflecting surfaces and configured to image the plurality of light beams upon different photosensitive members, respectively; and a synchronism detecting system configured to detect a synchronizing light beam for determining a writing start timing of an image upon each of said plurality of photosensitive members, with respect to each of the plurality of light beams scanningly deflected by said different deflecting surfaces of said rotary polygonal mirror; wherein each deflecting surface of said rotary polygonal mirror has a chamfer, wherein said synchronism detecting system detects a light beam emitted from a light source device, among said plurality of light source devices, other than a light source device which emits a light beam for forming an image on a photosensitive member for a black color, and wherein the light source device which emits a synchronizing light beam to be detected by said synchronism detecting system is configured to emit light at a timing as a light beam is incident on the chamfer so as to perform the synchronism detection through said synchronism detecting system.

The light source device which emits a light beam for forming an image on the photosensitive member for the black color, among said plurality of light source devices, may not emit light at the timing as the light beam is incident on the chamfer.

The synchronism detecting device may detect a light beam emitted from a light source means, among said plurality of light source devices, which emits a light beam for forming an image on a photosensitive member for a yellow color.

Each deflecting surface of said rotary polygonal mirror may have a chamfer, and the light beam for determining the writing start timing of the image on said photosensitive member, to be detected by said synchronism detecting system, may be a light beam deflected by the chamfer.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2A is a schematic diagram which depicts the relationship between the light emission timing of light source means and the timing as an input light impinges on the chamfer, in the first embodiment of the present invention, in relation to a yellow (Y) color.

FIG. 4A and FIG. 4B are schematic diagrams for explaining a chamfer.

FIG. 4C and FIG. 4D show an example of specifying a chamfer in the drawing.

FIG. 5A through FIG. 5D are schematic diagrams, respectively, which depict how the input light beam impinges on or does not impinge on a chamfer.

FIG. 6A, FIG. 6B and FIG. 6C are schematic diagrams which depict the relationship between the light emission timing of light source means and the timing as the input light beam impinges on the chamfer, in a conventional image forming apparatus.

DESCRIPTION OF THE PREFERRED EMBODIMENTS

An image forming apparatus according to the present invention may comprise a plurality of photosensitive drums for forming images of a plurality of colored lights, a plurality of light source means, and a rotary polygonal mirror having a plurality of deflecting surfaces for scanningly deflecting a plurality of light beams and each being formed with a chamfer. The image forming apparatus may further comprise a plurality of input optical systems for directing a plurality of light beams to the rotary polygonal mirror, a plurality of imaging optical systems for directing a plurality of light beams to the plurality of photosensitive drums, respectively, and synchronism detecting means for obtaining a synchronizing signal as the photosensitive drum is to be scanned in the main-scan direction.

On deflecting surface of the rotary polygonal mirror may serve to scanningly deflect light beams emitted from at least two light source means. The synchronism detecting means may detect a light beam emitted from a light source means which functions to form an image of colored light other than black, whereby a synchronizing signal may be obtained.

Here, the timing as the synchronism detecting means obtains a synchronizing signal and the timing as a light beam from the input optical system, which is at the side where the synchronism detecting means is provided, is incident on the chamfer of the deflecting surface of the rotary polygonal mirror, are at least partly overlapping.

Now, preferred embodiments of the present invention will be described with reference to the attached drawings.

Embodiment 1

Figure 1A:
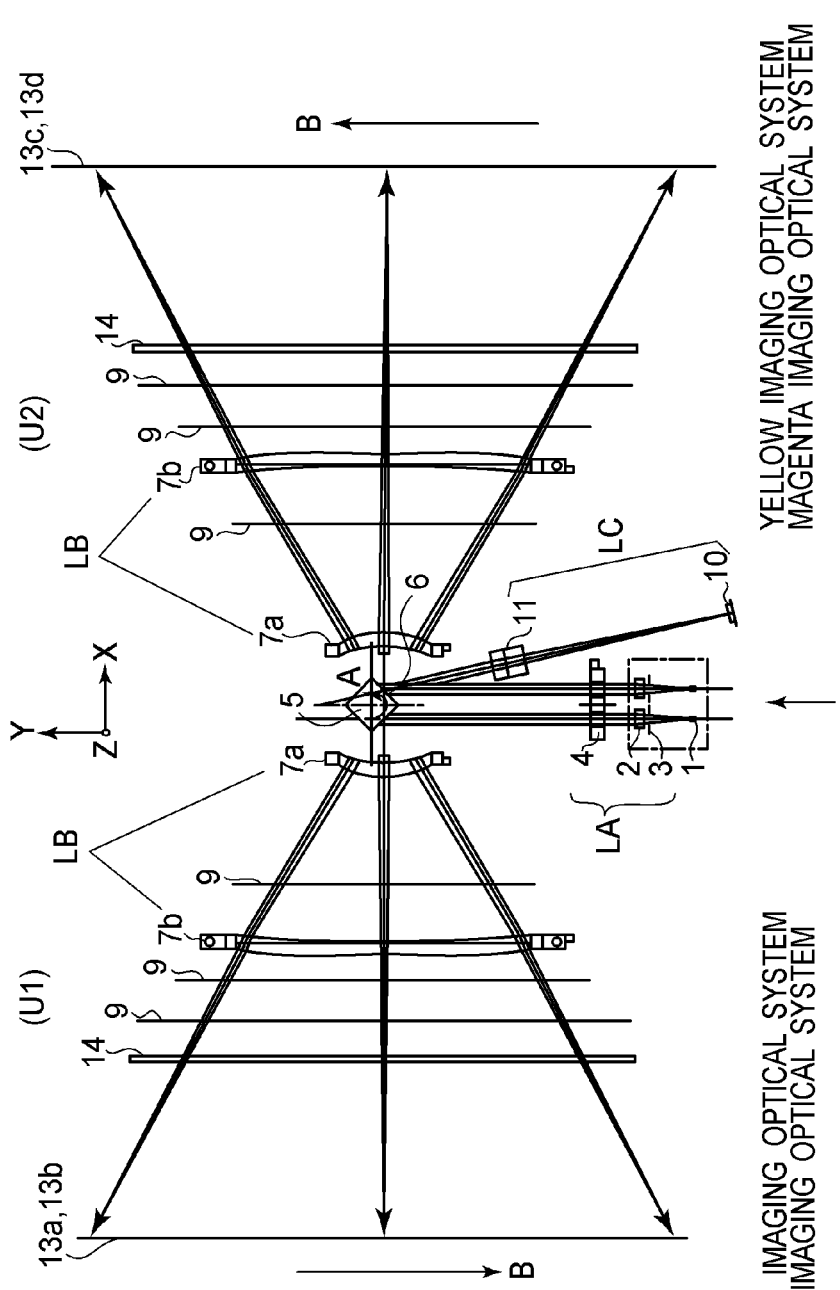
FIG. 1A is a main-scan sectional view of an image forming apparatus according to a first embodiment of the present invention.
Figure 1B:
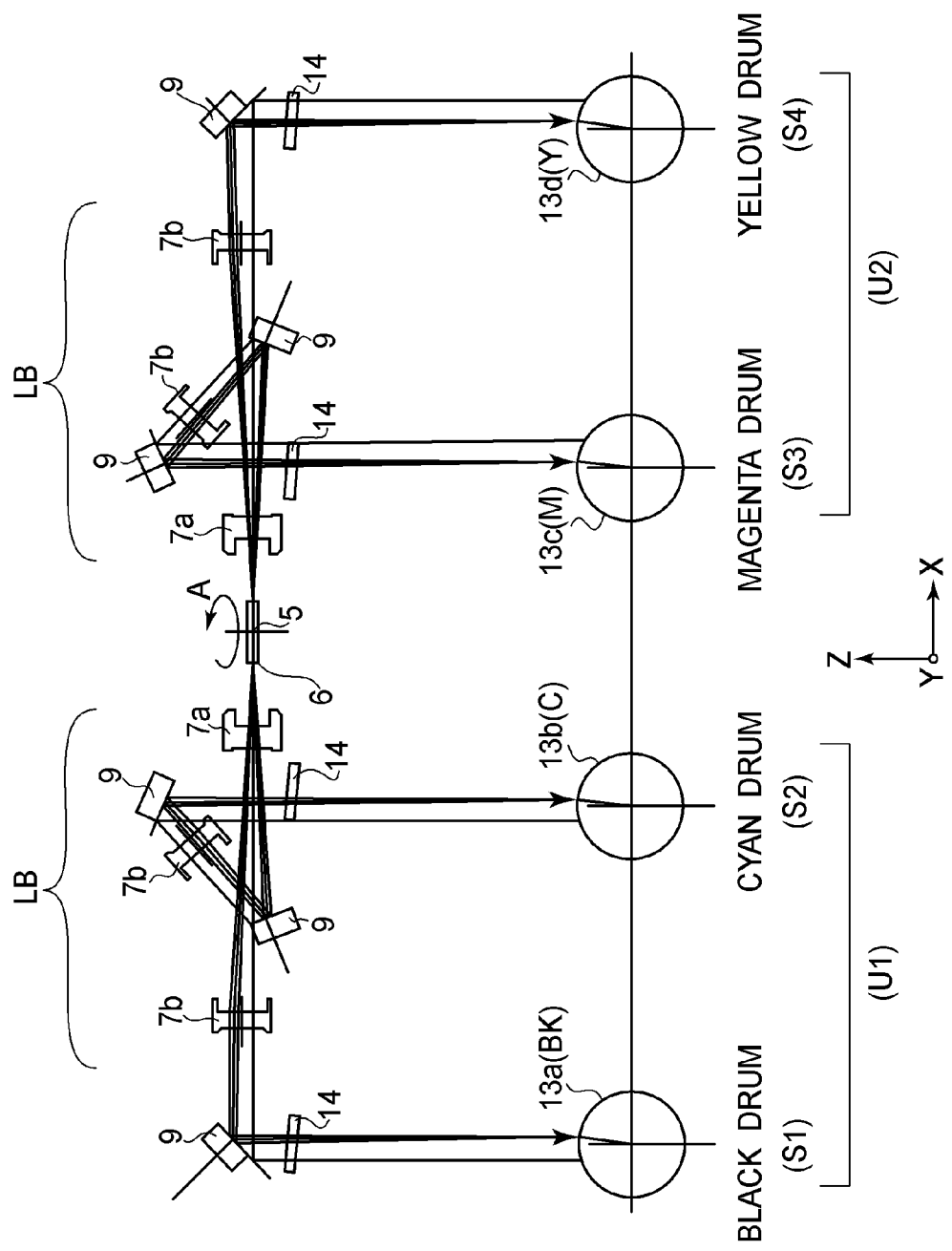
FIG. 1B is a sub-scan sectional view of an image forming apparatus according to the first embodiment of the present invention.

FIG. 1A is a sectional view (main-scan sectional view) of a main portion of a first embodiment of the present invention, along a main-scan direction. FIG. 1B is a sectional view (sub-scan sectional view) of a main portion of the first embodiment of the present invention, along a sub-scan direction.

In the following description, the term "main-scan direction" (Y-direction) refers to a direction in which the light beam is scanningly deflected by a rotary polygonal mirror as deflecting means.

The term "sub-scan direction" (Z-direction) refers to a direction which is parallel to the rotational axis of the deflecting means.

The term "main-scan section" refers to a plane with respect to which the rotational axis of the deflecting means is a normal.

The term "sub-scan section" refers to a plane with respect to which an axis in the main-scan direction (Y-direction) is a normal.

In FIG. 1A, the image forming apparatus (optical scanning device) comprises two scanning units U1 and U2. Since the first and second scanning unit U1 and U2 have the same structure and optical function, the following description will be made mainly around the first scanning unit U1. The components of the second scanning unit U2 corresponding to those of the first scanning unit U1 are illustrated with the same reference numerals, and they will be explained if necessary.

Denoted in the drawings at 1 is light source means which comprises a semiconductor laser having a light emitting member (light emission point). Denoted at 3 is an aperture (aperture stop) which serves to shape a light beam incident on a collimator lens 2 into a desired and optimum beam shape. The collimator lens 2 converts a light beam emitted from the light source means 1 into a parallel light beam. Denoted at 4 is a cylindrical lens which has a positive power (refracting power) only in the sub-scan direction.

Here, the aperture stop 3, collimator lens 2 and cylindrical lens 4 described above are components of an input optical system LA which functions to direct the light beam emitted from the light source means 1 to a deflecting surface (deflective reflection surface) 6 of a rotary polygonal mirror 5 to be described below the collimator lens 2 and the cylindrical lens 4 may be constituted by a single optical element (anamorphic lens).

Denoted at 5 is a rotary polygonal mirror (polygon mirror) having a plurality of deflecting surfaces. It rotates at a constant speed in the direction of an arrow A in the drawing. In this embodiment, the deflecting surfaces of the rotary polygonal mirror 5 are formed with chamfers, respectively. Furthermore, the number of deflecting surfaces of the rotary polygonal mirror 5 of the present embodiment is not more than the number of imaging optical systems to be described later. Here, the number is four. Also, the number of the imaging optical system is four.

Denoted at LB is an imaging optical system having a light collecting function and an fθ characteristic. It has a positive power (refracting power) in the main-scan section. Within the sub-scan section, it has a positive power different from the positive power in the main-scan section.

In this embodiment, the imaging optical system LB is comprised of first and second imaging lenses 7a and 7b. Within the main-scan section, the imaging optical system LB functions to image the light beam based on imagewise information and scanningly deflected by the rotary polygonal mirror 5, as a spot upon photosensitive drum surfaces (scan surfaces to be scanned) 13a and 13b (13c and 13d). Furthermore, within the sub-scan section the imaging optical system LB serves to provide an optically conjugate relationship between the deflecting surface 6 of the rotary polygonal mirror 5 and the photosensitive drum surface 13a and 13b (13c and 13d), by which surface tilt compensation for the deflecting surface 6 is carried out.

Denoted at 13a, 13b, 13c and 13d are photosensitive drums (photosensitive drum surfaces) on which images of different color lights are to be formed. In this embodiment, these colored lights include four colors of yellow (Y), magenta (M), cyan (C) and black (Bk).

Denoted at 9 is light ray separating means which comprises a reflecting mirror. In the imaging optical system LB, it functions to separate an upper oblique incidence light beam and a lower oblique incidence light beam from each other.

Denoted at S1 is a station for black (Bk), denoted at S2 is a station for cyan (C), denoted at S3 is a station for magenta (M), and denoted at S4 is a station for yellow (Y).

In this embodiment, a light beam optically modulated and emitted from the semiconductor laser 1 in accordance with the imagewise information goes through the aperture stop 3 (partly shaded thereby), and it enters the collimator lens 2. The light beam incident on the collimator lens 2 is converted into a parallel light beam which in turn enters a cylindrical lens 4. The light beam which goes out of the cylindrical lens is a parallel light beam within the main-scan section and, within the sub-scan section, it is a convergent light beam collected around the deflecting surface 6. The light beam is incident on the deflecting surface 6 of the rotary polygonal mirror 5, and it is imaged on the deflecting surface 6 of the rotary polygonal mirror 5 as a line image being elongated in the main-scan direction.

A light beam partly scanningly deflected by the deflecting surface 6 of the rotary polygonal mirror 5 is directed onto the photosensitive drum surfaces 13a and 13b (13c and 13d) by the imaging optical system LB. Then, by rotating the rotary polygonal mirror 5 in the direction of an arrow A, the photosensitive drum surfaces 13a and 13b (13c and 13d) are optically scanned in the direction of an arrow B (main-scan direction), and the imagewise information is recorded thereon.

Next, the structure and optical function of synchronism detecting means will be explained.

In FIG. 1A, denoted at LC is a synchronism detecting optical system (which will be referred to also as "BD optical system") as the synchronism detecting means. The BD optical system LC comprises a synchronism detecting lens (which will be referred to also as "BD lens") 11 and a synchronism detecting sensor lens (which will be referred to also as "BD sensor") 10 for detecting light.

This BD optical system LC serves to obtain a synchronizing signal (BD signal) when the photosensitive drum is to be scanned in the main-scan direction, based on the light beam from the light source means for forming an image of a colored light other than black. By this, the writing start timing of the image on the scan surface 13a, 13b, 13c or 13d is determined.

The BD lens 11 is disposed at a position through which the scanning light beam being scanningly deflected by the rotary polygonal mirror 5 passes. When the rotary polygonal mirror 5 takes a predetermined angle, the BD lens 11 directs a portion (BD light beam) of the scanning light beam to the BD sensor 10.

Rotating the rotary polygonal mirror 5 in the direction of an arrow A, the BD sensor 10 detects the timing as the rotary polygonal mirror 5 takes a predetermined angle, and the detected timing is outputted to control means (not shown).

Based on the timing outputted from the BD sensor 10, the control means controls the rotary polygonal mirror 5 so that the rotating speed thereof adjusted to a constant speed. Furthermore, based on that timing, the control means controls the light emission timing of each of the plural light source means.

This embodiment uses two, upper and lower input optical systems LA which are disposed along the sub-scan direction, although not shown in the drawing. Within the sub-scan section, light beams from the two input optical systems LA are incident on a single deflecting surface 6 from obliquely above and obliquely below, respectively (oblique incidence optical system). The two light beams obliquely incident on the deflecting surface 6 are conically scanned by the rotary polygonal mirror 5 upwardly and downwardly, respectively. Then, by the light ray separating means 9 disposed inside an imaging optical system LB, these light beams are scanned as an imaging spot on the two different photosensitive drum surfaces 13a and 13b (13c and 13d).

There are two sets of imaging optical systems LB which are disposed opposed to each other across the rotary polygonal mirror 5, and they function to image the light beams from different deflecting surfaces of the same rotary polygonal mirror 5.

In the present embodiment as described above, a plurality of input optical systems LA are comprised of an oblique incidence optical system and, furthermore, a plurality of imaging optical systems LB are disposed opposed to each other across the rotary polygonal mirror 5. With this arrangement, some optical components are shared and, thus, the image forming apparatus as a whole can be made compact.

In this embodiment, the ridgeline between adjoining deflecting surfaces of the rotary polygonal mirror is chamfered. By this chamfering, in this embodiment, the finishing precision for cutting the deflecting surface is improved. Furthermore, the rotary polygonal mirror of the present embodiment is provided with the surfaces (namely, chamfers) created between adjoining deflecting surfaces by the chamfering.

This embodiment concerns an image forming apparatus to be used in a color image forming apparatus in which, based on the scanning light beams projected on the four photosensitive drums 13a, 13b, 13c and 13d, toner particles of four colors are fixed on a paper sheet to form a color image thereon. FIG. 1B illustrates the four photosensitive drums 13a, 13b, 13c and 13d for forming an image of four colors of colored lights.

In FIG. 1B, there are a drum 13d for yellow (Y), a drum 13c for magenta (M), a drum 13b for cyan (C) and a drum 13a for black (Bk), which are disposed respectively in this order from the right-hand side as viewed in the drawing. In this embodiment, the scanning light beams scanningly deflected by the rotary polygonal mirror are directed to the respective photosensitive drums by means of an imaging optical system for yellow (Y), an imaging optical system for magenta (M), an imaging optical system for cyan (C), and an imaging optical system for black (Bk), respectively.

In FIG. 1A, the imaging optical system LB of the second scanning unit U2 represents the imaging optical system for yellow (Y) and the imaging optical system for magenta (M). Furthermore, the imaging optical system LB of the first scanning unit U1 disposed opposed to that of the second scanning unit across the rotary polygonal mirror 5 represents the imaging optical system for cyan (C) and the imaging optical system for black (Bk).

In this embodiment, a BD optical system LC is provided only at the position (station S4) where the light beam which scans the imaging optical system for directing the scanning light beam to the drum for yellow (Y) in FIG. 1B (i.e., the drum at the right-side end in the diagram) passes through.

In other words, the BD optical system LC is disposed only at the imaging optical system side for yellow (Y) which is at a side of the rotary polygonal mirror 5 remote from the imaging optical system for black (Bk).

In this embodiment, synchronism detection (BD detection) is carried out by using the imaging optical system for yellow (Y) and, by measuring any error in the division of four surfaces of the rotary polygonal mirror, a synchronizing signal (BD signal) is generated depending on each surface. With this procedure, the writing start timings in those imaging optical systems other than the one for yellow, having no BD optical systems, can be well registered.

Figure 2B:
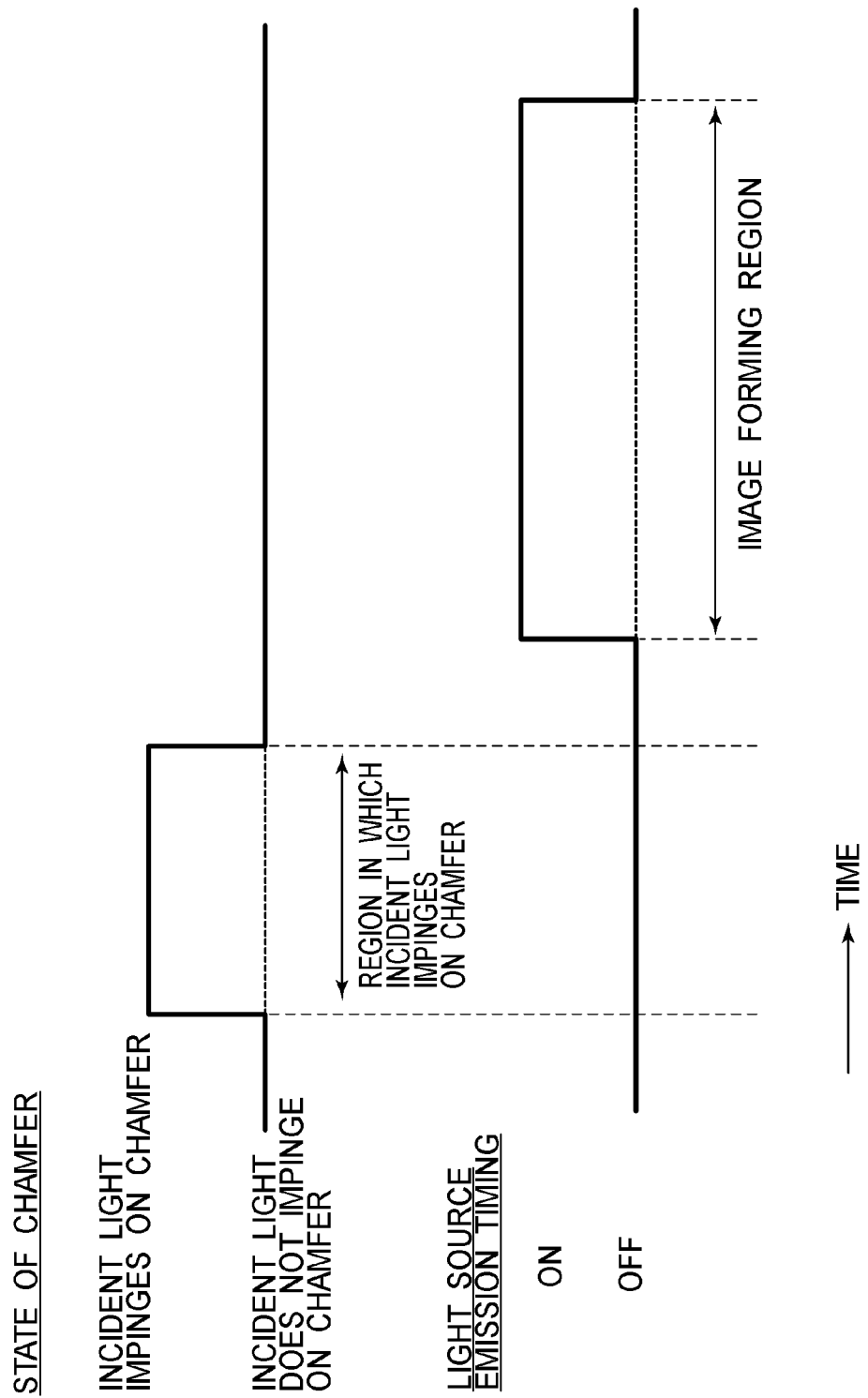
FIG. 2B is a schematic diagram which depicts the relationship between the light emission timing of light source means and the timing as an input light impinges on the chamfer, in the first embodiment of the present invention, in relation to colors of black (Bk), cyan (C) and magenta (M).
Figure 3A:
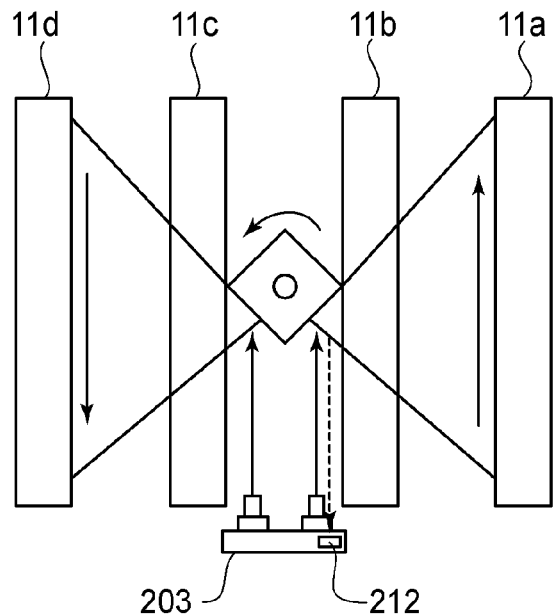
FIG. 3A is a main-scan sectional view of a conventional image forming apparatus.
Figure 3B:
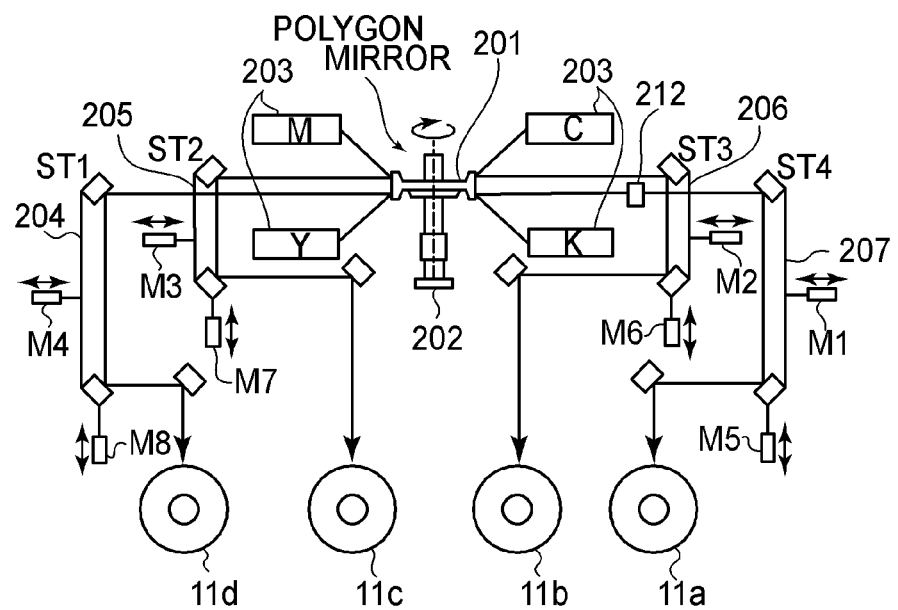
FIG. 3B is a sub-scan sectional view of a conventional image forming apparatus.

FIG. 2A and FIG. 2B are schematic diagrams illustrating the light emission timing of the light source means of the present embodiment and the timing as the input light beam impinges on the chamfer. FIG. 2A is a schematic diagram concerning the source means for yellow (Y) as well as an input light therefrom, and FIG. 2B is a schematic diagram concerning the source means for black (Bk), cyan (C) and magenta (M) as well as an input light therefrom.

It is seen from FIG. 2A that, in this embodiment, the timing as the BD optical system LC obtains a BD signal and the timing as the light beam from the input optical system for yellow (Y) is incident on the chamfer of the deflecting surface of the rotary polygonal mirror 5 are at least partly overlapping.

More specifically, in the present embodiment, the light source means for yellow (Y) emits a light beam (BD light beam) for obtaining a BD signal at the timing as the light beam impinges on the chamfer.

It is to be noted that, in this embodiment, the timing from the pre-light emission of the light source means of the BD optical system LC to the detection of the BD signal is included in the time period in which the light beam corresponding to the imaging optical system at the side where the BD optical system LC is disposed is being incident on the chamfer of the rotary polygonal mirror 5.

Figure 7:
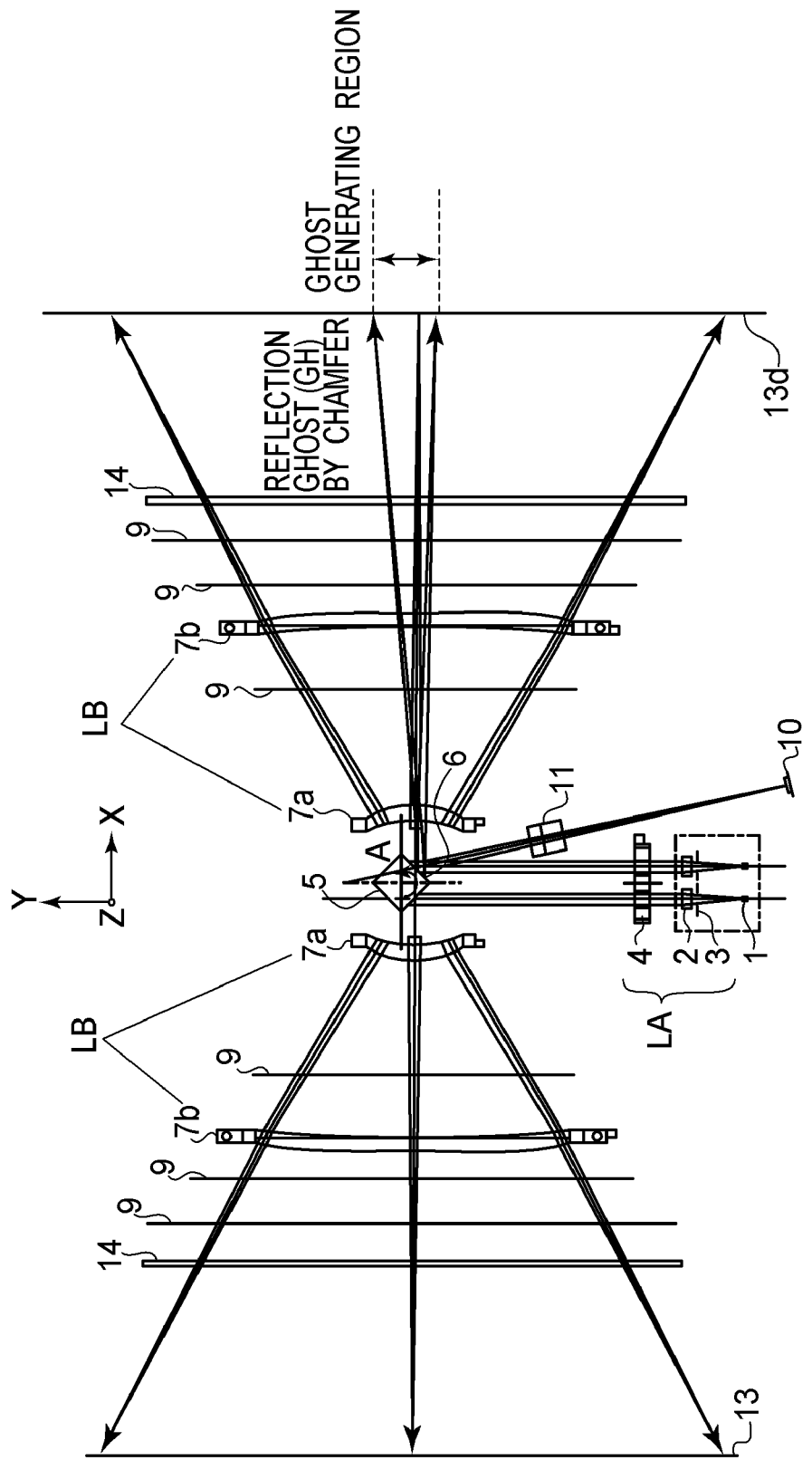
FIG. 7 is a main-scan sectional view illustrating a light path of a reflection ghost produced at the chamfer.

As a result of this, there is a possibility that the reflection light reflected by the chamfer is incident on the photosensitive drum 13d for yellow. FIG. 7 shows the light path of a reflection ghost produced at the chamfer in such case. FIG. 7 is a sectional view of a main portion in the main-scan direction, illustrating the light path of the reflection ghost at the chamfer. As shown in FIG. 7, the reflection ghost GH at the chamfer passes through the imaging optical system LB and it reaches the photosensitive drum surface 13d.

On the other hand, as seen from FIG. 2B, the light source means other than the one for yellow (Y) do not emit a light beam (BD light beam) for obtaining a BD signal, at the timing as the light beam impinges on the chamfer.

This means that only in the imaging optical system for yellow (Y) there occurs ghost light (which will be referred to also as "reflection ghost") due to the chamfer; whereas there occurs no reflection ghost due to the chamfer, in the three imaging optical systems other than the one for yellow (Y).

In other words, in this embodiment, among the four colors of yellow (Y), magenta (M), cyan (C) and black (Bk), the BD optical system is disposed at the side of the imaging optical system for yellow (Y) which is least conspicuous, and the BD detection is carried out only at the imaging optical system side for yellow (Y). With this arrangement in this embodiment, the influence of the reflection ghost at the chamfer upon the image is minimized.

However, if the BD optical system is disposed at the side of any imaging optical system for a color which is less conspicuous than black, the advantage effects of the invention will be provided. Therefore, the BD optical system of the present embodiment may be disposed at the side of the imaging optical system for magenta (M) or the imaging optical system for cyan (C).

Although the present embodiment uses photosensitive drums of four colors of yellow (Y), magenta (M), cyan (C) and black (Bk) to form a full color image, the present invention is not limited to this. For example, even in a case of two colors of yellow and black only or in a case of three colors of magenta, cyan and black only, the BD optical system may be disposed at the side of the imaging optical system corresponding to the one other than black which is most conspicuous in an image, and the BD detection may be carried out using that. The advantageous effects of the invention are assuredly provided in that case. For example, in the case of two colors of yellow and magenta, the BD may be taken based on yellow. In the case of three colors of magenta, cyan and black, the BD may be taken based on magenta.

Furthermore, although the present embodiment uses photosensitive drums of four colors, photosensitive drums of five colors including black (e.g., yellow (Y), magenta (M), light magenta (LM), light cyan (LC), cyan (C) and black (Bk)) or more colors may be used. Even in that occasion, the BD optical system may be disposed at the side of an imaging optical system corresponding to one other than black which is most conspicuous in the image, and the BD detection may be carried out using that. Similar advantageous effects as mentioned above are obtainable in that case.

In this embodiment, among four photosensitive drums, the BD optical system is provided with respect to only one of them: that is, the BD optical system is disposed only at the side of the imaging optical system for yellow (Y). However, the present invention is not limited to this. For example, among a plurality of photosensitive drums, plural BD optical systems may be disposed in relation to more than one photosensitive drum if these are for colors less conspicuous than black, so as to improve the precision of the writing start position upon each photosensitive drum. An example is that BD optical systems may be disposed at the side of the imaging optical system for magenta (M) and at the side of the imaging optical system for cyan (C) as well, and the BD detection may be carried out using them. The advantageous effects of the present invention are assuredly provided in that occasion.

In other words, in this embodiment, the number of the BD optical systems is not limited to one, and the advantageous effects of the present invention are assuredly provided as long as the number is less than that of the imaging optical systems.

In this embodiment, the imaging optical system is configured to be a surface tilt correction system in which the deflection point of the rotary polygonal mirror and a portion around it as well as the image plane are placed in a conjugate relationship with each other, such that a deviation of the scanning light beam on the photosensitive drum due to the surface tilt of the deflecting surface of the rotary polygonal mirror is corrected. For this reason, even if the chamfer tilts in the sub-scan direction, the reflection ghost reflected by the chamfer, as far as it is incident on the second imaging lens 7b of the imaging optical system for yellow (Y), is assuredly directed only to the photosensitive drum for yellow (Y). Since yellow is least conspicuous in the image, the density unevenness of the formed image due to the reflection ghost from the chamfer can be sufficiently suppressed.

Furthermore, if the diffusion angle by the chamfer is wide or the surface tilt of the chamfer is large, the reflection ghost will be incident on not only the second imaging lens 7b of the imaging optical system for yellow but also the second imaging lens 7b of the imaging optical system for magenta which is disposed spaced apart in the sub-scan direction. As a result, a reflection ghost may occur at the drum for yellow (Y) and a drum for magenta (M).

In this embodiment, the imaging optical system for yellow (Y) and the imaging optical system for magenta (M) from which reflection ghosts may occur are disposed at a side of the rotary polygonal mirror which is remote from the imaging optical system for black (Bk). With this arrangement, the reflection ghost due to the chamfer is prevented from reaching the drum for black (Bk).

More specifically, in this embodiment, the imaging optical system in which the BD optical system should be provided and the imaging optical system for black (Bk) which is most conspicuous in the image are disposed opposed to each other across the rotary polygonal mirror. With this configuration, even if the diffusion angle of the chamfer is so wide or the surface tilt is so large, the photosensitive drum which may cause a reflection ghost is set only with respect to yellow and magenta which are less conspicuous than black, and the influence on the image due to the surface tilt ghost is diminished.

In this embodiment, the input light beam is incident on the deflecting surface of the rotary polygonal mirror in a direction which is tilted by 3 degrees in the sub-scan direction. Namely, an oblique incidence optical system having an oblique incidence angle of 3 degrees is constituted. However, the oblique incidence angle is not limited to this. Furthermore, the optical system does not need to be an oblique incidence optical system. For example, the structure may comprise imaging optical systems corresponding to a plurality of photosensitive drums including a drum for black (Bk), and a BD optical system may be disposed at the side of an imaging optical system corresponding to any color other than black which is most conspicuous in the image. The BD detection may be carried out using that. The advantage effects of the present invention are assuredly provided in that occasion.

The chamfer of the present embodiment has a planar shape. However, even if it has a concave shape or convex shape, since the reflection ghost reflected by the chamfer is directed to the photosensitive drum, the advantage effects of the invention are assuredly provided.

The chamfer of the present embodiment is formed between two adjoining deflecting surfaces of the rotary polygonal mirror, and the relative angular difference of the same with the deflecting surface is set to be approximately 45 degrees. However, the invention is not limited to this. For example, even with a relative angular difference other than 45 degrees, since a reflection ghost occurs at the chamfer if the input light impinges on the chamfer, the advantage effects of the invention are assuredly provided.

In this embodiment, for ease in understanding the reflection ghost by the chamfer, the reflected light at the chamfer has been explained as being specular reflection light. Actually, however, as long as the input light impinges on the chamfer, there occurs a reflection ghost by the chamfer regardless of that the surface of the chamfer is a mirror surface or a diffusion surface. Thus, the advantage effects of the invention are assuredly provided.

Furthermore, if the chamfer has a diffusion surface, the reflected light therefrom is a diffused light. Therefore, in that case, the reflected light is diffused to a wider angular range than the case of regular reflection. If the diffusion characteristic of the chamfer is wide, the reflected light spreads in the sub-scan direction and, as a result, the reflection ghost is incident on not only the imaging optical system for yellow (Y) but also the imaging optical system for magenta (M) which is disposed at a lower position in the sub-scan direction. Consequently, the reflection ghost passes through the imaging optical system for magenta (M), and it reaches the drum for magenta (M).

In this embodiment, the imaging optical system for black (Bk) is disposed opposed to the imaging optical system with a BD optical system, across the rotary polygonal mirror. Therefore, regardless of the diffusion surface structure of the chamfer, it is assured that the reflection ghost is prevented from reaching the drum for black (Bk) which is most conspicuous in the image. Namely, the influence of the reflection ghost at the chamfer on the image unevenness can be diminished by that.

FIG. 4D mentioned hereinbefore is a diagram illustrating the width of the chamfer of the present embodiment. In this embodiment, the width $W_m$ of the chamfer is set to be $W_m$=0.15 mm. Thus, with respect to the width $W_p$ of the deflecting surface $W_p$=14.14 mm, it is set at a 1.1% width.

Although in this embodiment the width $W_m$ of the chamfer is equal to 1.1% of the width $W_p$ of the deflecting surface, the invention is not limited to this value. As long as the width $W_m$ of the chamfer is not less than 0.5% and not greater than 5% of the width $W_p$ of the deflecting surface, the finishing precision of the deflecting surface by the chamfering is assuredly attainable and the advantage effects of the invention are surely provided.

In the case of a rotary polygonal mirror with fewer deflecting surfaces, the angle defined between adjoining deflecting surfaces is an acute angle. Thus, as compared with a rotary polygonal mirror having a larger number of deflecting surfaces, the effect of improvement of the finishing precision of the deflecting surface due to the chamfering will be large. Furthermore, in the case of a rotary polygonal mirror with four deflecting surfaces as in the preferred embodiment, since the diameter thereof is small, a plurality of imaging optical systems (and scanning units) can be easily disposed opposed to each other across the rotary polygonal mirror.

On the other hand, since the quantity of shifting the optical axis of the input optical system from the center of rotation tends to be large, the input light beam easily impinges on the chamfer. From this, if the rotary polygonal mirror has fewer deflecting surfaces, particularly when it has four deflecting surfaces, a ghost easily occurs at the chamfer.

For the reasons described above, the present embodiment uses a rotary polygonal mirror with deflecting surfaces of a number four, and it is comprised of a structure with which the effect of improving the finishing precision of the deflecting surface due to the provision of the chamfering formation as well as the effect of diminishing the influence on the image by the reflection ghost, namely, the advantageous effects of the present embodiment, are best assured.

However, although the present embodiment uses a rotary polygonal mirror with deflecting surfaces of a number four, the invention is not limited to this. As long as the BD optical system is disposed at the side of any imaging optical system for a color other than the one most conspicuous in the image, the advantage effects of the invention are assuredly provided.

In this embodiment, for a higher printing speed, the rotating speed of the rotary polygonal mirror is set at a fast speed of 40,000 rpm. Therefore, the field angle region in which the light source means is kept emitting the light for the BD detection is set as large as 0.071 rad to 1.08 rad (4.09 deg. to 6.2 deg.) with respect to the optical axis of the input optical system.

Furthermore, in this embodiment, the BD optical system is disposed at the upstream side (writing start side) with respect to the rotational direction of the rotary polygonal mirror at the imaging optical system side for yellow (Y), it may be disposed at the downstream side (writing finish side) with respect to rotational direction of the rotary polygonal mirror. The advantageous effects of the present invention are assuredly provided even in that occasion.

In this embodiment, the angle of the deflecting surface of the rotary polygonal mirror as the scanning light beam is scanningly deflected along the optical axis of the BD optical system is defined as a BD field angle: it is taken as 0 rad when in the main-scan section the optical axis of the input optical system and a surface normal to the deflecting surface are parallel to each other. Then, the light source means of the station S4 for yellow (Y) having a BD optical system starts light emission (pre-light emission) just before the rotary polygonal mirror takes the BD field angle. The angle of the deflecting surface of the rotary polygonal mirror at this moment (the starting field angle of the synchronism detecting pre-light emission of the BD optical system side light source means) is defined as $\theta_B$ [rad].

Furthermore, the followings are assumed in the present embodiment:

The radius of a circumscribing circle of the rotary polygonal mirror is R [mm];

The width of the chamfer of the rotary polygonal mirror is $W_m$ [mm];

The number of the deflecting surfaces of the rotary polygonal mirror is M;

The distance between the optical axis of the input optical system and the center of rotation of the rotary polygonal mirror is h [mm];

The light beam width of the input light beam incident on the deflecting surface, within the main-scan section, is W [mm]; and The width in the main-scan section of the deflecting surface of the rotary polygonal mirror is $W_p$ [mm].

Then, the rotary polygonal mirror, input optical system and BD optical system are so configured to satisfy conditional expressions (1) and (3) below.

$$(R - W_m) \times \sin(a) < \left(h + \frac{W}{2}\right) \quad (1)$$

$$a = \theta_B + \frac{\pi}{M} \times \left(1 - \frac{W_m}{R\sin(\pi/M)}\right) \quad (2)$$

$$\frac{W_m}{W_p} \geq 0.005 \quad (3)$$

If the conditional expressions (1) and (3) above are satisfied, it leads to that the light source means emits light at the timing as the input light beam impinges on the chamfer. Namely, a reflection ghost due to the reflection of the input light beam occurs at the chamfer.

The conditional expression (3) means that, as described hereinbefore, the ratio of the width $W_m$ of the chamfer to the width $W_p$ of the deflecting surface should be not less than 0.5%. If the ratio is 0.5% or more, the finishing precision of the deflecting surface due to the chamfering is assuredly obtainable, and the advantage effects of the present invention are surely provided.

More preferably, the following conditional expression had better be satisfied:

$$W_m/W_p < 0.05 \quad (3a)$$

The left-hand side of the relational expression (2) is an equation for calculating the angle which is defined between the optical axis of the input optical system and a straight line that connects an end portion of the chamfer (at a side closer to the optical axis of the input optical system) and the center of rotation of the rotary polygonal mirror, in the state of the rotary polygonal mirror as the BD pre-light emission has just started (the start of pre-light emission for synchronism detection (BD)).

The left-hand side of the conditional expression (1) is an equation for calculating the spacing between the chamfer end portion (at a side closer to the optical axis of the input optical system) and a straight line which passes through the center of rotation of the rotary polygonal mirror and which is parallel to the optical axis of the input optical system, in the state of the rotary polygonal mirror as the BD pre-light emission has just started.

The right-hand side of the conditional expression (1) is an equation for calculating the spacing between the end portion of the incident light beam in the main-scan direction (at a side remote from the center of rotation of the rotary polygonal mirror) and a straight line which passes through the center of rotation of the rotary polygonal mirror and which is parallel to the optical axis of the input optical system.

Hence, if the condition prescribed by the conditional expression (1) is met, it results as follows. Namely, in the state of the rotary polygonal mirror as the BD pre-light emission has just started, the end portion of the input light beam in the main-scan direction (at a side remote from the center of rotation of the rotary polygonal mirror) comes closer to a straight line which passes through the center of rotation of the rotary polygonal mirror and which is parallel to the optical axis of the input optical system, than the chamfer end portion (at a side close to the optical axis of the input optical system). In other words, in the state of the rotary polygonal mirror as the BD pre-light emission has just started, the input light beam impinges on the chamfer.

Therefore, if the conditional expression (1) is satisfied, ghost light reflected at the chamfer occurs. Hence, a BD optical system is disposed at the side of an imaging optical system other than the imaging optical system for black (Bk) which is most conspicuous in the image and the BD detection using the same is carried out. Then, the advantageous effects of the present invention are assuredly provided.

In this embodiment, parameters in the aforementioned expressions (1), (2) and (3) are set as follows:

R=10 m;
$W_m$=0.15 mm;
M=4 surfaces;
$\theta_B$=0.071 rad (=4.09 deg);
h=5.59 mm;
W=3.64 mm;
$W_p$=14.14 mm.

In this embodiment, the width $W_m$ of the chamfer is set as $W_m$=0.15 mm as described hereinbefore. Hence, the width $W_p$ of the deflecting surface is set as $W_p$=14.14 mm such that:

$$W_m/W_p=0.011>0.005$$

This satisfies the conditional expression (3).

Furthermore, the value a of the left-hand side of the relational expression (2) is:

a=0.84

Furthermore, the value of the right-hand side of the conditional expression (1) is:

Right-hand side=7.41 mm

The value of the left-hand side is:

Left-hand side=7.34 mm

Thus, these are set to satisfy the conditional expression (1).

In this embodiment, the BD optical system is disposed at the upstream side of the imaging optical system with respect to the direction of rotation of the rotary polygonal mirror. However, it may be disposed at the downstream side. Namely, in the optical system in which the light source means is caused to emit light at the timing as the input light beam is incident on the chamfer, since there occurs ghost light due to reflection of the input light beam at the chamfer, the advantageous effects of the present invention are assuredly provided.

In this embodiment, as the input light beam impinges on the chamfer at the time of the BD pre-light emission, a reflection ghost is produced at the chamfer. However, the invention is not limited to this. Even if the input light beam impinges on the chamfer for any purpose other than the BD pre-light emission, such as the APC adjustment, for example, a reflection ghost may be produced at the chamfer. Hence, the advantageous effects of the present invention are assuredly provided even in such case.

In this embodiment, the light beam incident on the rotary polygonal mirror is set as a parallel light beam in the main-scan section. However, the invention is not limited to this. Even if it is a convergent light beam or a divergent light beam, as long as the light beam width at the deflection point of the rotary polygonal mirror or in the neighborhood thereof meets the aforementioned conditional expressions (1) and (3), since in that occasion the input light beam impinges on the chamfer, the advantageous effects of the present invention are assuredly provided.

Furthermore, in this embodiment, within the sub-scan section a light beam from the input optical system at the synchronism detecting means side and a light beam from the input optical system for black (Bk) are incident on a single deflecting surface of the rotary polygonal mirror, in oblique directions. Additionally, the incidence angle of the light beam from the input optical system at the BD optical system side, being incident on the deflecting surface of the rotary polygonal mirror, and the incidence angle of the light beam from the input optical system for black (Bk) being incident on the deflecting surface of the rotary polygonal mirror, are made different from each other. The advantageous effects of the present invention are assuredly provided even if the components are so configured.

Furthermore, although in this embodiment two sets of imaging optical systems are disposed opposed to each other across the rotary polygonal mirror, the present invention is not limited to this. For example, a plurality of imaging optical systems may be disposed at only one side of the rotary polygonal mirror. Even in that occasion, by disposing the BD optical system at the imaging optical system side for a color other than the color which is most conspicuous in the image, the advantageous effects of the present invention are assuredly provided.

Next, Table 1 below shows the structure of the imaging optical system according to the first embodiment. Table 2 shows R, D and N of the input optical system in the first embodiment. Table 3 shows the aspherical shape of the cylindrical lens 4 in the first embodiment. Table 4 shows the aspherical shape of the imaging lenses 7a and 7b, constituting an imaging optical system of the first embodiment.

It is to be noted that, in Table 4, the seventh surface corresponds to the light entrance surface of the imaging lens 7a, the eighth surface corresponds to the light exit surface of the imaging lens 7a, the ninth surface corresponds to the light entrance surface of the imaging lens 7b, and the tenth surface corresponds to the light exit surface of the imaging lens 7b.

TABLE 1

Structure of the First Embodiment

| | | | |
|---|---|---|---|
| Angle between optical axes of input optical system and imaging optical system in main-scan direction | 2φ | 90 | (deg) |
| Max. effective scan field angle | ±θ max | 38.2 | (deg) |
| Collimator lens focal length | Fcol | 20 | (mm) |
| Polygon circumscribing radius | R | 10.0 | (mm) |
| Sub-scan oblique incidence angle (upper imaging optical system) | α1 | 3 | (deg) |
| Sub-scan oblique incidence angle (lower imaging optical system) | α2 | −3 | (deg) |
| Imaging optical system sub-scan magnification | Bs | 1.3 | (times) |
| Sub-scan direction resolution | Dpi | 600 | (dpi) |
| Effective scan width | Wy | 210 | (mm) |
| Stop diameter in main-scan direction | Am | 2.92 | (mm) |
| Stop diameter in sub-scan direction | As | 1.44 | (mm) |
| fθ coefficient of imaging optical system | K | 167.8 | (mm/rad) |
| Width of chamfer | Wm | 0.15 | (mm) |
| Input optical system light beam diameter | W | 3.64 | (mm) |
| Width of rotary polygonal mirror deflecting surface | Wp | 14.14 | (mm) |
| Shift amount between input optical system optical axis and rotary polygonal mirror rotational axis | h | 5.59 | (mm) |
| BD pre-light emission starting field angle | θB | 0.071 | (rad) |
| BD field angle | θE | 1.08 | (rad) |
| Angle between optical axes of input optical system and BD optical system | B | 12.4 | (deg) |

TABLE 2

RDN of the First Embodiment

| | Surface | R | D | N |
|---|---|---|---|---|
| Semiconductor laser emission point 1 | 1st | — | 16 | 1 |
| Stop | | — | 2.32 | 1 |
| Collimator lens 2 | 2nd | infinite | 3 | 1.762 |
| | 3rd | 15.22 | 12.43 | 1 |
| Cylindrical lens 4 | 4th | Table 3 | 3 | 1.524 |
| | 5th | infinite | 77.26 | 1 |
| Deflecting surface 6 of polygon mirror | 6th | infinite | 16 | 1 |

TABLE 2-continued

RDN of the First Embodiment

| | Surface | R | D | N |
|---|---|---|---|---|
| Imaging optical system lens 7a | 7th | Table 4 | 5 | 1.524 |
| | 8th | Table 4 | 61.3 | 1 |
| Imaging optical system lens 7b | 9th | Table 4 | 4 | 1.524 |
| | 10th | Table 4 | 103.8 | 1 |

TABLE 3

Cylindrical Lens of the First Embodiment

| | | Cylindrical lens 4 |
|---|---|---|
| | | 4th surface |
| Meridional shape | R | infinite |
| Sagittal shape | r | 58.62 |

TABLE 4

Aspherical Shape of Imaging Optical System of the First Embodiment

| | | Imaging lens 7a | | Imaging lens 7b | |
|---|---|---|---|---|---|
| | | 7th surface | 8th surface | 9th surface | 10th surface |
| Meridional shape | R | −3.9609E+01 | −2.7559E+02 | −1.0297E+03 | 9.7015E+02 |
| | K | −1.5180E+00 | −2.8213E+00 | −8.8075E+02 | 2.0189E+00 |
| | B4 | −1.0846E−05 | −1.0270E−05 | −1.4002E−07 | −6.2822E−06 |
| | B6 | 2.3498E−08 | 2.9887E−8 | 1.1905E−11 | 5.6760E−11 |
| | B8 | −1.5342E−10 | −7.1586E−11 | 8.5688E−16 | −2.7512E−15 |
| | B10 | 2.0904E−13 | 6.0716E−15 | 1.6198E−20 | −2.0821E−19 |
| Sagittal shape | r | −1.0E+03 | −1.0E+03 | 1.7125E+02 | −2.827E+01 |
| | D2 | 0 | 0 | 0 | 1.4137E−04 |
| | D4 | 0 | 0 | 0 | −3.2588E−08 |
| | D6 | 0 | 0 | 0 | 5.9948E−12 |
| | D8 | 0 | 0 | 0 | −2.8299E−16 |
| | D10 | 0 | 0 | 0 | −2.3929E−20 |

However, the aspherical shape is defined by the following expressions.

The point of intersection between the lens curved surface and the optical axis is taken as an origin. The optical axis direction is taken as an X-axis. An axis orthogonal to the optical axis within the main-scan plane is taken as a Y-axis. An axis orthogonal to the optical axis within the sub-scan plane is taken as a z-axis. The cutting line between the X-Y plane and the lens curved surface is taken as a meridional, while the cutting line between the X-Z plane which is in a direction orthogonal thereto and the lens curved surface is taken as a sagittal. Then, the shape of the meridional is represented by an expression (A) below.

$$X = \frac{Y^2/R}{1 + \sqrt{\frac{(1-(1+K)\times}{(Y/R)^2}}} + B_4Y^4 + +B_6Y^6 + B_8Y^8 + B_{10}Y^{10} \quad (A)$$

where R is the curvature radius, K, $B_4$, $B_6$, $B_8$ and $B_{10}$ are aspherical coefficients of the meridional.

The shape of the sagittal is represented by an expression (B) below.

$$S = \frac{Z^2/r'}{1 + \sqrt{(1-(Z/r')^2}} \quad (B)$$

Here, the curvature radius r' of the sagittal which varies with the value of Y is represented by an expression (C) below.

$$r'=r_0\times(1+D_2Y^2+D_4Y^4+D_6Y^6+D_8Y^8+D_{10}Y^{10}) \quad (C)$$

where $r_0$ is the sagittal curvature radius on the optical axis, and $D_2$, $D_4$, $D_6$, $D_8$ and $D_{10}$ are coefficients.

[Embodiment of Color Image Forming Apparatus]

Figure 8:
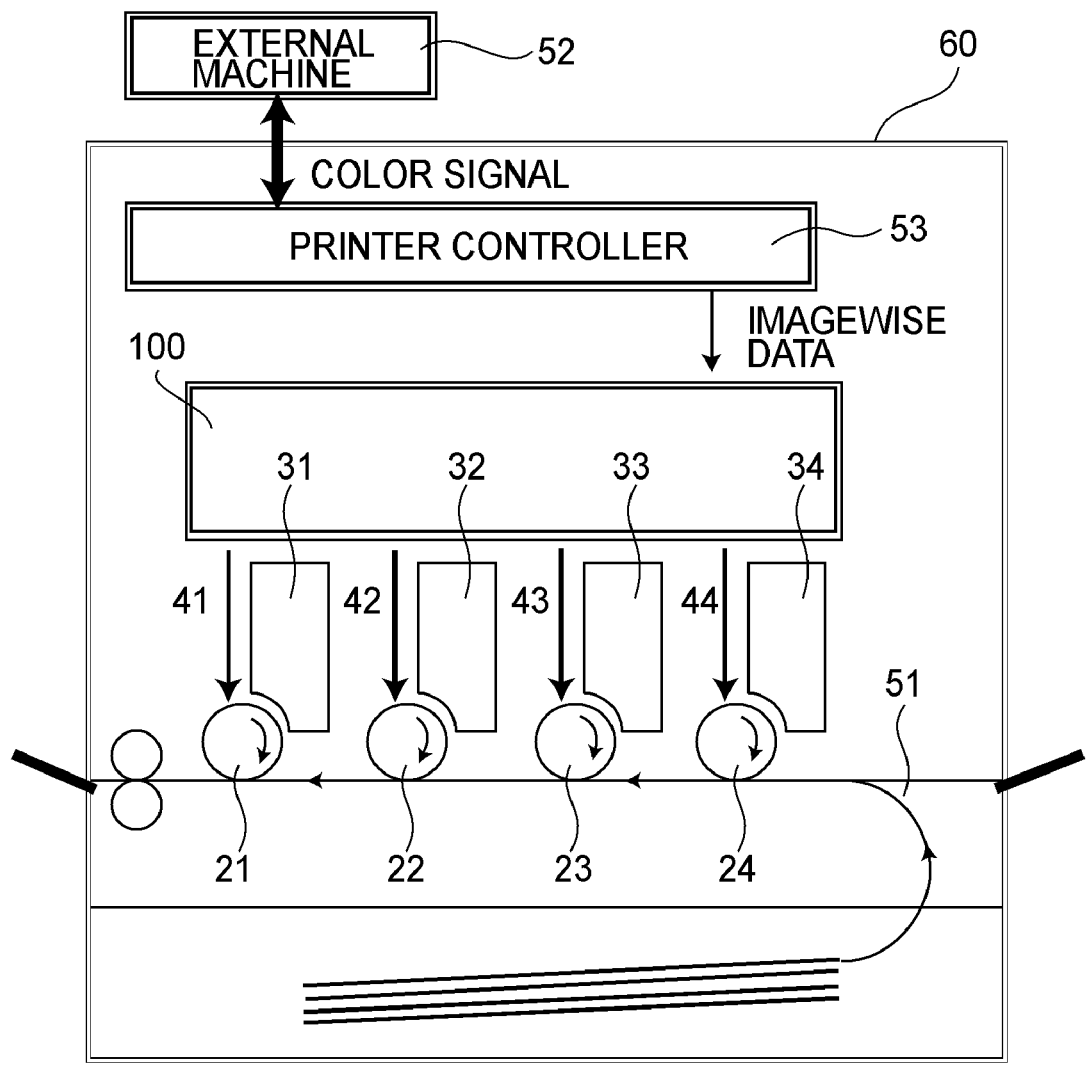
FIG. 8 is a schematic diagram of a main portion of a color image forming apparatus according to an embodiment of the present invention.

FIG. 8 is a schematic view of a main portion of a color image forming apparatus according to an embodiment of the present invention.

This embodiment is directed to a tandem type color image forming apparatus in which four light beams are scanned by an image forming apparatus so that imagewise data of different colors are recorded in parallel to each other on corresponding photosensitive drums (image bearing members).

In FIG. 8, denoted generally at 60 is a color image forming apparatus, and denoted at 100 is an image forming apparatus having the structure described with reference to the first embodiment. Denoted at 21, 22, 23 and 24 are photosensitive drums (image bearing members) for forming images of different colors, respectively. Denoted at 31, 32, 33 and 34 are developing devices, respectively. Denoted at 51 is a conveyance belt.

In FIG. 8, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and B (black). These imagewise data are inputted into the image forming apparatus 100. In response, the image forming apparatus 100 produces light beams 41, 42, 43 and 44 having been modulated in accordance with the associated imagewise data. Through these light beams, the photosensitive surfaces of the photosensitive drums 21, 22, 23 and 24 are scanned in the main-scan scan direction.

In the color image forming apparatus of this embodiment, four light beams are scanned by the image forming apparatus 100, and these correspond to colors of C (cyan), M (magenta), Y (yellow) and B (black), respectively. These imagewise signals are recorded in parallel to each other upon the surfaces of the photosensitive drums 21, 22, 23 and 24, respectively, so that a color image can be printed at high speed.

As described, in the color image forming apparatus of this embodiment, the image forming apparatus 100 functions to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-168764 filed Jun. 27, 2008, for which is hereby incorporated by reference.

What is claimed is:

1. An image forming apparatus comprising:
   a plurality of light source devices;
   a rotary polygonal mirror configured to scanningly deflect, with different deflecting surfaces, a plurality of light beams emitted from said plurality of light source devices;
   a plurality of imaging optical systems provided in relation to the plurality of light beams, respectively, scanningly deflected by said different deflecting surfaces and configured to image the plurality of light beams upon different photosensitive members, respectively; and
   a synchronism detecting system configured to detect a synchronizing light beam for determining a writing start timing of an image upon each of said plurality of photosensitive members, with respect to each of the plurality of light beams scanningly deflected by said different deflecting surfaces of said rotary polygonal mirror;
   wherein each deflecting surface of said rotary polygonal mirror has a chamfer,
   wherein said synchronism detecting system detects a light beam emitted from a light source device, among said plurality of light source devices, other than a light source device which emits a light beam for forming an image on a photosensitive member for a black color,
   wherein the light source device which emits a synchronizing light beam to be detected by said synchronism detecting system is configured to emit light at the timing as a light beam is incident on the chamfer so as to perform the synchronism detection through said synchronism detecting system, and
   wherein said light source device which emits a light beam for forming an image on the photosensitive member for the black color, among said plurality of light source devices, does not emit light at the timing as the light beam is incident on the chamfer.

2. An image forming apparatus as claimed in claim 1, wherein said synchronism detecting device detects a light beam emitted from a light source means, among said plurality of light source devices, which emits a light beam for forming an image on a photosensitive member for a yellow color.

3. An image forming apparatus as claimed in claim 1, wherein the light beam for determining the writing start timing of the image on said photosensitive member, to be detected by said synchronism detecting system, is a light beam deflected by the chamfer.

* * * * *